United States Patent
Spahn

(10) Patent No.: US 8,290,222 B2
(45) Date of Patent: Oct. 16, 2012

(54) SYSTEMS AND METHODS OF IMAGE PROCESSING UTILIZING RESIZING OF DATA

(75) Inventor: Martin Spahn, Chicago, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 1535 days.

(21) Appl. No.: 11/546,887

(22) Filed: Oct. 12, 2006

(65) Prior Publication Data
US 2010/0278451 A1    Nov. 4, 2010

Related U.S. Application Data

(60) Provisional application No. 60/840,764, filed on Aug. 29, 2006.

(51) Int. Cl.
*G06K 9/00* (2006.01)
(52) U.S. Cl. ........................................ 382/128
(58) Field of Classification Search .......... 382/128–132, 382/293–300; 379/9; 345/619–689; 348/580; 128/922
See application file for complete search history.

(56) References Cited

U.S. PATENT DOCUMENTS

| | | | | |
|---|---|---|---|---|
| 4,196,352 A * | 4/1980 | Berninger et al. | ................. | 378/7 |
| 4,712,178 A * | 12/1987 | Tuy et al. | ........................... | 378/9 |
| 5,375,156 A * | 12/1994 | Kuo-Petravic et al. | ........... | 378/9 |
| 6,028,913 A | 2/2000 | Meulenbrugge et al. | | |
| 6,198,790 B1 * | 3/2001 | Pflaum | .............................. | 378/9 |
| 6,246,746 B1 * | 6/2001 | Conrads et al. | .............. | 378/98.7 |
| 6,718,011 B2 | 4/2004 | Spahn | | |
| 6,912,266 B2 | 6/2005 | Spahn | | |
| 6,990,175 B2 * | 1/2006 | Nakashima et al. | ............ | 378/65 |
| 7,016,455 B2 | 3/2006 | Bruder et al. | | |
| 7,075,061 B2 | 7/2006 | Spahn | | |
| 7,086,779 B2 | 8/2006 | Fadler | | |
| 7,145,980 B2 * | 12/2006 | Sakaguchi et al. | ................. | 378/7 |
| 7,305,062 B2 * | 12/2007 | Hambüchen et al. | ............. | 378/9 |
| 7,443,955 B2 * | 10/2008 | Sakaguchi et al. | ........... | 378/98.8 |
| 7,570,730 B2 * | 8/2009 | Kohler et al. | ..................... | 378/4 |
| 7,583,784 B2 * | 9/2009 | Andreas | ............................ | 378/9 |
| 7,680,241 B2 * | 3/2010 | David et al. | ........................ | 378/7 |

(Continued)

FOREIGN PATENT DOCUMENTS
EP    0938250 A2 *    8/1999

OTHER PUBLICATIONS

Arcilla et al, Left Ventricle Volume Calculation by Angiocardiography in ChildrenCHEST, vol. 63, No. 2, Feb. 1973.*

(Continued)

*Primary Examiner* — Alex Liew
*Assistant Examiner* — Andrae S Allison
(74) *Attorney, Agent, or Firm* — Alexander J Burke

(57) ABSTRACT

An image processing system and method to resize image data from two sources of image data. The method includes receiving a first matrix of image data from a first detector and a second matrix of image data from a second detector. Detector-specific image correction is performed on the first matrix data and the second matrix data independently. The first matrix and the second matrix are re-mapped into virtual matrices of a common size, which are processed through a common image pipeline. The virtual matrices are remapped into different matrix sizes for further processing or display.

26 Claims, 7 Drawing Sheets

U.S. PATENT DOCUMENTS

| | | | |
|---|---|---|---|
| 2005/0161610 | A1 | 7/2005 | Spahn |
| 2005/0218296 | A1 | 10/2005 | Spahn |
| 2005/0226484 | A1* | 10/2005 | Basu et al. .................. 382/131 |
| 2006/0001601 | A1 | 1/2006 | Ono |
| 2006/0188063 | A1 | 8/2006 | Spahn |

OTHER PUBLICATIONS

"Adaptive Spatial-temporal filtering applied to x-ray fluoroscopy angiography" Gert Schoonenberg, et al.

"Motion Detection Algorithms" by Andrew Kirillov; posted Apr. 30, 2005.

"A quantitative comparison of motion detection algorithms in fMRI" by Babak A. Ardekani, et al.; received Apr. 11, 2001; accepted Jun. 17, 2001.

"Retrospective Motion Correction in Digital Subtraction Angiography: A Review" by Erik H. W. Meijering, et al.; IEEE Transactions on Medical Imaging, vol. 18, No. 1, Jan. 1999, pp. 2-21.

"Motion Detection for Adaptive Spatio-Temporal Filtering of Medical X-Ray Image Sequences" By Marc Hensel, et al.; 2005 Springer. In: H.-P. Meinzer, et al. (Edt).: *Bildverarbeitung fur die Medizin 2005: Algorithmen, Systems, Amvendungen*, Springer, 2005 (ISBN 3-540-25052-2). Proceedings BVM 2005, Heidelberg, Germany, Mar. 13-15, 2005.

"A 3-D space-time motion detection for an invariant image registration approach in dig angiography" vol. 97, Issue 1 (Jan. 2005).

"Evaluating Motion Detection Algorithms: Issues and Results" by J. Renno, et al.

"Motion Detection and Recognition Research" by Randal C. Netionand, et al.

"A Robust and Computationally efficient motion detection algorithm based on background estimation" by A. Manzenera, et al.

Chapter 10. Controlling Frame Rate Part II Programing with OpenGL Performer.

"A User's Guide for SCRIP; A Spherical Coordinate Remapping and Interpolation Package" version 1.4 Philip W. Jones et al. Theoretical Division, Los Alamos National Laboratory 1997, 1998 Regents of the University of California pp. 1-27.

"Flat Detectors and Their Clinical Applications" Dr. Martin Spates, Eur Radiol (2005) 15:1934-1947; published Apr. 2, 2005.

\* cited by examiner

SYSTEMS AND METHODS OF IMAGE PROCESSING UTILIZING RESIZING OF DATA

CROSS-REFERENCE TO RELATED APPLICATIONS

This application claims a priority benefit to provisional application Ser. No. 60/840,764, filed on Aug. 29, 2006 and entitled "Image Processing Applying Resizing to a Standard Matrix Size," which is hereby incorporated by reference in its entirety herein.

BACKGROUND

1. Field of the Invention

This invention relates generally to imaging systems. More specifically, the present invention is directed to systems and methods of image processing in which images from different detectors or different detector configurations are resized to a standard matrix size.

2. Background Discussion

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs.

Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack.

Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

Recent advances in x-ray imaging have allowed the acquisition of digital radiographic images. Different x-ray applications, such as cardiac angiography, interventional angiography, and general radiography will apply different, specifically designed, x-ray flat-panel detectors. Differences typically include the size, image formats, pixel size, frame rates, dose sensitivity, and other parameters of the x-ray detectors. Differences between detectors can arise because the pixels of the x-ray detector are hardwired to the input screen. For example, for flat-panel detectors, the x-ray conversion layer is directly coupled to the underlying pixel matrix.

Conventional image processing typically involves both frequency-domain and time-domain techniques. Frequency-dependent processing may include such techniques as edge enhancement, dynamic range compression, and other advanced multi-frequency filter techniques. Temporal filter techniques may include motion-detection algorithms and time-domain filters. Most of these algorithms depend on the actual pixel size of the detector (including combined super-pixels generated by binning techniques) and the local noise level or signal-to-noise ratio. The pixel size influences the object-sizes on which the algorithms operate, while the signal-to-noise-ratio, which is governed by the dose as well as the pixel size, influences the thresholds or distinction capabilities between noise and structure in those algorithms which involve local or global noise analysis.

Recently, increased use of combinations of applications, such as combination labs for combined cardiovascular as well as peripheral angiography applications, has lead to mixed detector types being used, with each detecting having different characteristics and specific designs. For example, different planes of a single combination lab may utilize different detectors, thereby introducing the problem of different image parameters in a single application.

In another example, a user may use two different labs utilizing two different detector configurations, and may later wish to reconcile the different images taken by the two different detectors, again introducing the problem of different image parameters in a single application.

Conventional techniques to attempt to overcome image quality differences in such combined detector applications typically include attempts for individual parameter optimization. A similar approach that has been attempted involves individual parameter optimization of the image processing pipeline for each detector type so that the image characteristics are as close as possible. This approaches has the disadvantages that (1) it requires independent parameter handling; and (2) it may not be feasible.

Furthermore, independent parameter handling is becoming increasingly complex with the increasing complexity of the algorithms being used.

For example, independent parameter handling is unacceptable when used, for example, with edge-enhancements, which require small, odd-sized kernels, such as 3×3, 5×5, or 7×7 pixel kernels. In such instances, the parameters are discrete, and no fine-matching is possible. Also, in an instance in which two detectors are used, one with a small 150 μm pixel size, and the other with a larger 200 μm pixel size; in the first detector, a 5×5 pixel kernel will act on 750 μm size object structures, while the second detector will act on 1000 μm size object structures. Using a 5×5 kernel for the small pixel detector and a 3×3 kernel for the larger pixel detector will not resolve the problem, and in fact no other kernel size will be an appropriate alternative.

Clearly, this conventional approach has disadvantages for parameter complexity, and inconsistency of image processing from one detector type to another.

Therefore, it would be an advancement in the state of the art to provide a system and method of image processing of images in which images from different detectors are resized to a standard matrix size.

SUMMARY

Thus, the present invention is directed to systems and methods of image processing that resize input images to a standard matrix size.

Accordingly, one embodiment of the present invention is directed to a method for processing image data from two or more sources. This method (hereinafter, "the method") includes accessing first image data from a first source and accessing second image data from a second source. The first image data is re-mapped to form a first matrix and the second image data is re-mapped to form a second matrix. The second matrix has the same dimensions as the first matrix. The first matrix and the second matrix are processed based on a predetermined set of instructions.

Another embodiment of the present invention is directed to the method described above and also includes generating the first image data from a first detector, and generating the second image data from a second detector.

Yet another embodiment of the present invention is directed to the method described above wherein the first detector and the second detector are x-ray detectors under different operating conditions.

Yet another embodiment of the present invention is directed to the method described above and also includes performing image correction specific to the first detector on the first image data prior to the remapping of the first image data, and performing image correction specific to the second detector on the second image data prior to the remapping of the second image data.

Yet another embodiment of the present invention is directed to the method described above wherein structures from the one or more sources are represented by approximately the same quantity of pixels.

Yet another embodiment of the present invention is directed to the method described above wherein a signal-to-noise ratio of the first matrix and a signal-to-noise ratio of the second matrix are approximately equal.

Yet another embodiment of the present invention is directed to the method described above and also includes re-mapping the first matrix and the second matrix into matrices of different dimensions.

Yet another embodiment of the present invention is directed to the method described above wherein the first matrix is in a binned or non-binned configuration.

Yet another embodiment of the present invention is directed to the method described above wherein the second matrix is in a binned or non-binned configuration.

Yet another embodiment of the present invention is directed to the method described above and also includes performing a bi-linear interpolation process during the re-mapping of the first matrix and during the remapping of the second matrix.

Yet another embodiment of the present invention is directed to the method described above and also includes performing a bi-cubic interpolation process during the re-mapping of the first matrix and during the remapping of the second matrix.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
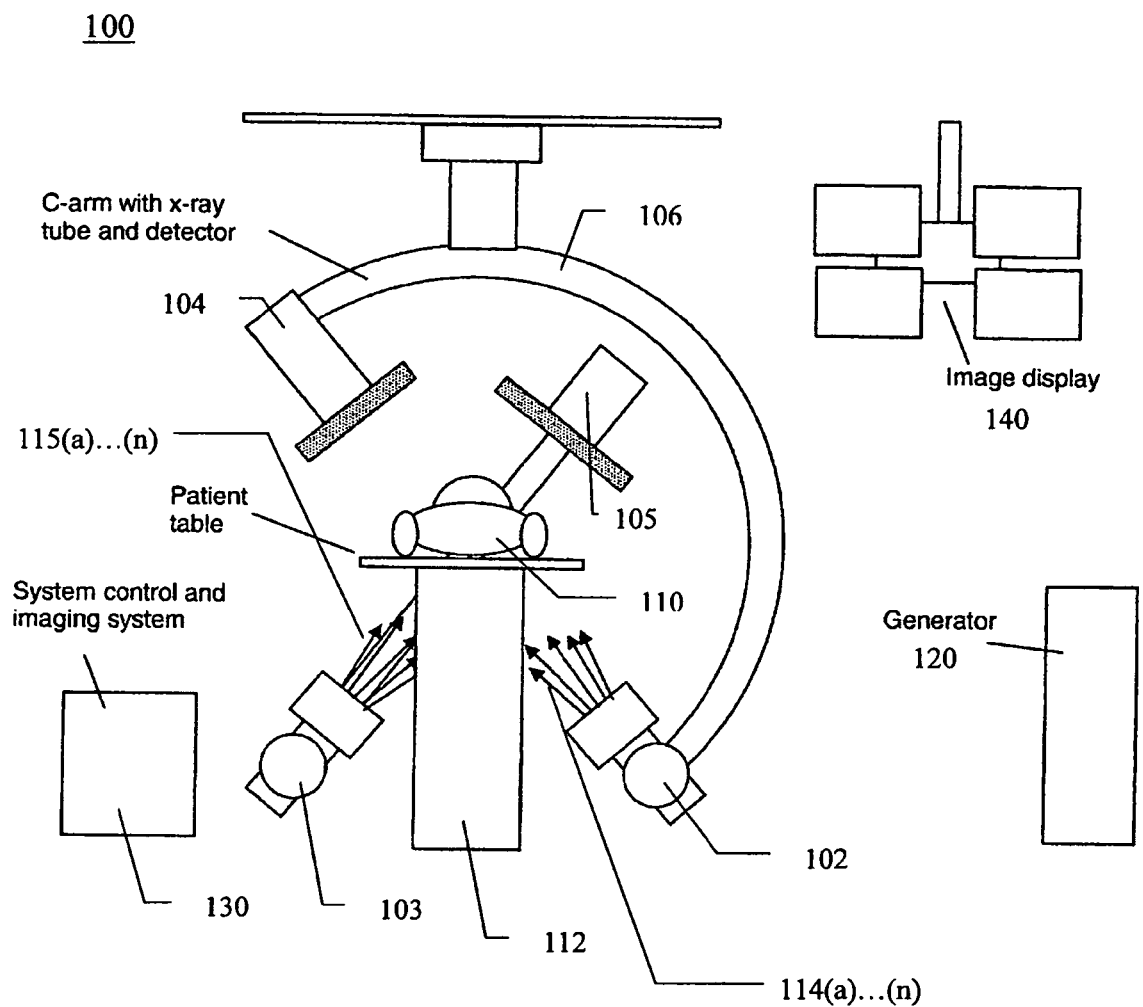
FIG. 1 illustrates an image processing system using two different detectors in a single combo lab.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

A detailed description of radiography, angiography, and x-ray imaging systems may be found in the following treatises:

Baum, Stanley and Michael J. Pentecost, eds. *Abram's Angiography*, 4$^{th}$ ed. Philadelphia: Lippincott-Raven, 1996, which is hereby incorporated by reference in its entirety herein;

Jeanne, LaBergem, ed. *Interventional Radiology Essentials*, 1$^{st}$ ed. Philadelphia: Lippincott Williams & Wilkins, 2000, which is hereby incorporated by reference in its entirety herein; and Johns, Harold E. and John R. Cunningham. *Physics of Radiology*, 4$^{th}$ ed. Charles C. Thomas Publisher Ltd., 1983, which is hereby incorporated by reference in its entirety herein.

To improve x-ray detector design-independent image processing, the present invention provides that images of a given format are resized to a standard matrix size, before image processing algorithms (such as frequency-dependent or signal-to-noise sensitive algorithms) are applied. An image processing method includes receiving a first matrix of image data from a first detector and a second matrix of image data from a second detector. Detector-specific image correction is performed on the first matrix and the second matrix independently. The first matrix and the second matrix are re-mapped into virtual matrices of a common size. The virtual matrices are processed through a common image pipeline and re-mapped into different matrix sizes for further processing or display.

An embodiment of the present invention is a system and method of image processing that resizes input images to a standard matrix size. For example, a given format or zoom size (defined by the actual dimensions of the imaging area) will typically be mapped onto the same matrix size (defined by a given number of pixels per length dimension), before entering the image pipeline. Only detector-specific corrections (such as gain and offset corrections, and pixel defect interpolation) are applied before this re-mapping. This approach results in a given object size being represented by the same number of pixels in the re-mapped matrix (provided that the original object size is reasonably large compared to the original pixel size).

After matrix re-mapping, the re-mapped matrices are processed in a common image pipeline. After image processing, the matrices may be re-mapped again into two matrices of different dimensions for display or further processing.

According to an embodiment of the invention, illustrated in FIG. 1, a patient 110 is placed on a table 112. A support member, such as a C-arm, 106 supports an x-ray emitting unit, such as an x-ray tube, 102 and an x-ray detecting unit, such as an x-ray detector, 104. A second x-ray emitting unit, such as an x-ray tube, 103 and a second x-ray detecting unit, such as an x-ray detector, 105 are also shown. The x-ray emitting unit 102 is adapted to emit x-rays 114($a$) . . . ($n$) (where "n" identifies a plurality of x-ray signals). The x-ray emitting unit 103 is adapted to emit x-rays 115($a$) . . . ($n$) (where "n" identifies a plurality of x-ray signals).

The first x-ray emitting unit 102 and the first x-ray detector 104 are positioned in a first plane relative to the patient 110 and the second x-ray emitting unit 103 and the second x-ray detector 105 are positioned in a second plane relative to the patient 110.

The x-ray detecting unit 104 is adapted to absorb and measure the emitted x-rays 114 and x-ray detecting unit 105 is adapted to absorb and measure the emitted x-rays 115. X-ray detectors 104 and 105 may be two different detector types, or may be the same detector types that are configured differently. That is, the two detectors may either feature different physical pixel sizes, or they may feature the same detector type with one detector running "binned" and the other detector running "unbinned." (Binning is a common detector configuration option in which two or more physical pixels are grouped into one virtual pixel.) Images of all or parts of the patient 110 may be obtained using the x-ray emitters 102, 103, x-ray detectors 104, 105 and x-rays 114, 115. The images typically assist in the diagnosis and/or treatment of the patient 110.

FIG. 1 also shows a generator unit 120, which is used to generate the x-rays emitted by the x-ray emitting units 102 and 103. The x-ray generator 120 is typically, for example, an x-ray producing device that includes a source of electrons, a vacuum within which the electrons are accelerated, and an energy source that causes the electrons to be accelerated.

A system control unit and imaging system 130 controls the operation of the entire system 100, performs image processing, and transmits the image data for display on the image display unit 140.

The display unit 140 is used to display the image data generated by the system 100. This display unit 140 may be, for example, a monitor, LCD (liquid crystal display), a plasma screen, or other module adapted to display output data typically by a representation of pixels. The system control and imagining system 130 includes a processor and memory modules and is described in more detail herein.

Figure 2:
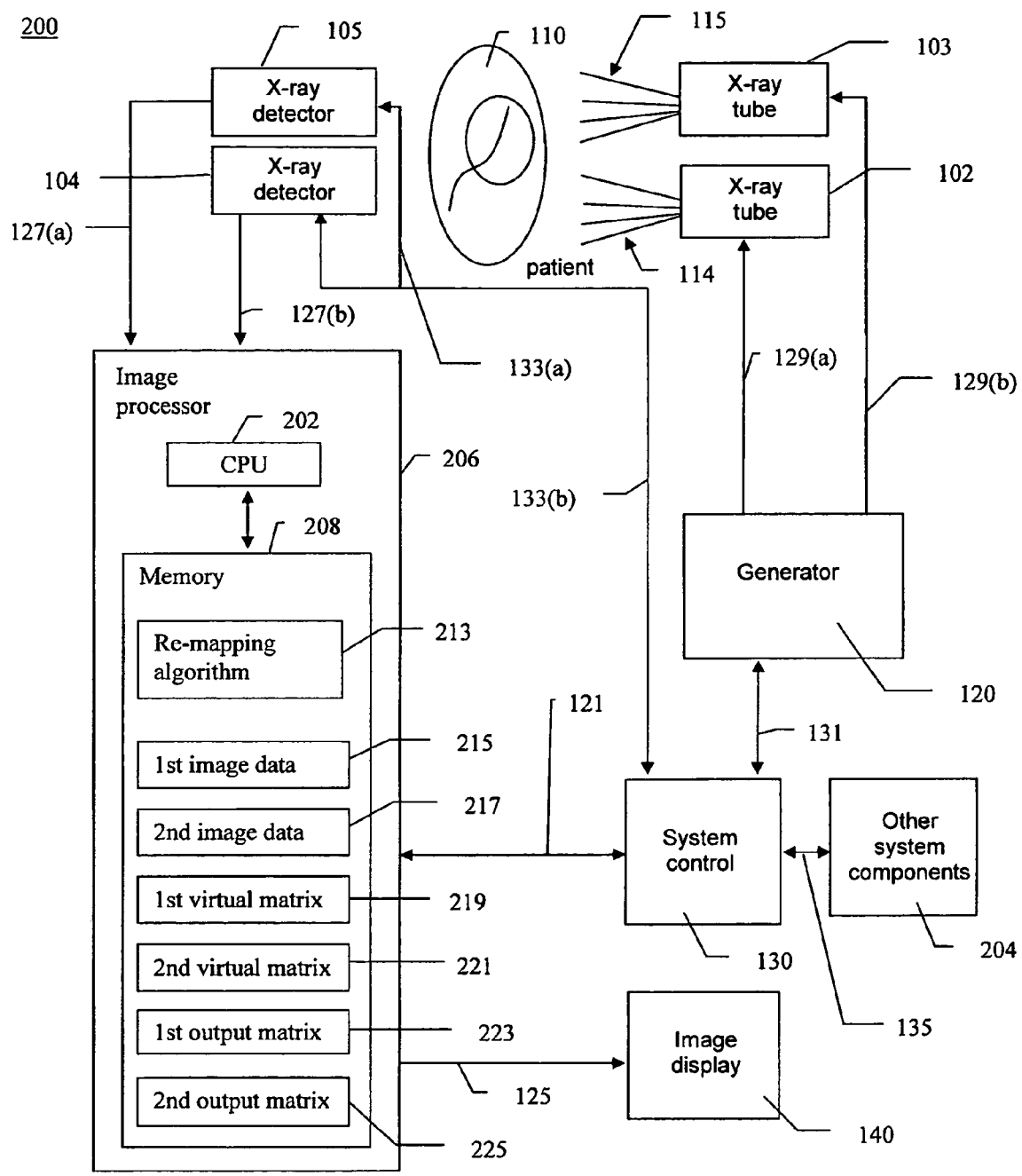
FIG. 2 illustrates an embodiment of an imaging system with two distinct detector types.

FIG. 2 shows a block diagram 200 of an example of an x-ray angiography system. As shown in FIG. 2, x-rays 114 are emitted along a first plane from a first x-ray emitting apparatus, such as an x-ray tube, 102 and directed toward a patient 110. X-rays 115 are emitted along a second plane (the second plane being different from the first plane) from a second x-ray emitting apparatus, such as an x-ray tube, 103 and directed toward a patient 110. X-rays 114 are detected by detection apparatus 104 and x-rays 115 are detected by detection apparatus 105. The detected x-rays are transmitted, via transmission mediums 127($a$) and 127($b$), which are typically a wire connection, communication bus, such as an IEEE bus, or other data transmission medium suitable to transmit data signals or pulses that represent the output from x-ray detectors 104, 105 to an image processing module 206.

The image processing module 206 (described in more detail below) is in bi-directional communication, via transmission medium 121, with system control unit 130 (described in more detail below) and is in communication with image display unit 140, via transmission medium 125. The image processor 206 stores and processes the detected data, received from detector units 104 and 105, and provides the output to system control unit 130, which is in bi-directional communication, via transmission medium 135, with other system components 204. The system control unit 130 provides control signals to generator unit 120, via transmission medium 131, which adjusts, if necessary, the x-rays emitted by x-ray emitting units 102 and 103. The system control unit 130 provides control signals to x-ray detectors 104 and 105, via transmission media 133($a$) and 133($b$).

The image processing module 206 includes a central processing unit (CPU) 202, which is in bi-directional communication with memory module 208.

The CPU 202 is typically a processor that includes an arithmetic logic unit (ALU), which performs arithmetic and logical operations, and a control unit (CU), which extracts instructions from memory and decodes and executes them, utilizing the ALU when necessary.

The memory module 208 includes algorithm module 213, first image data storage module 215, second image data storage module 217, first virtual matrix storage module 219, second virtual matrix storage module 221, first output matrix storage module 223 and second output matrix module 225.

Algorithm module, or facility, 213 is used to store resizing, or re-mapping, algorithms. These algorithms include a series of steps to resize matrix data received from x-ray detector 104 and/or x-ray detector 105. The resizing algorithm, or re-mapping, algorithm is a series of steps to adjust, or modify, the matrix dimensions of image data. The re-mapping algorithms may be executed by the CPU 202 and utilize and/or store data in the other memory modules 215, 217, 219, 221, 223 and/or 225. The output of the execution of the resizing algorithms is typically provided to display module 140 or transmitted to another processing, storage, or display location. The algorithms also resize image data after processing to generate output matrices. The module 213 is typically an electronic storage medium adapted to store a series of steps, or program code, in electronic form and may be solid state storage, such as random access memory (RAM) or cache memory. It may also include recorders to read mass storage devices such as, for example, optical disks, magnetic disks, flash semiconductor disks, and other types of storage which may be temporary or permanent. The module 213 can provide the algorithms to the CPU 202 and/or system controller 130.

Memory module 215 is typically an electronic storage medium that stores first image data received from x-ray detector 104. The resizing algorithms and other detector-specific correction algorithms can process the first image data stored in memory 215.

Memory module 217 is typically an electronic storage medium that stores second image data received from x-ray detector 105. The resizing algorithms and other detector-specific correction algorithms can process the first image data stored in memory 217.

Memory module 219 is typically an electronic storage medium that stores first virtual matrix data, which is generated from the first image data, stored in module 215.

Memory module 221 is typically an electronic storage medium that stores second virtual matrix data, which is generated from the second image data stored in module 217.

Memory module 223 is typically an electronic storage medium that stores first output matrix data, which is generated from the first virtual matrix.

Memory module 225 is typically an electronic storage medium that stores second output matrix data, which is generated from the second virtual matrix.

The output from the image processing module 206 is provided to image display module 140. The output is typically a resized image data display that is the result of re-mapping and processing the first and second matrix data. The image display module 140 is typically a monitor, LCD (liquid crystal display), a plasma screen, or other graphical user interface that can display output data. Also, the image display module 140 may be coupled to another CPU, processor, or computer, such as a desktop computer, or a laptop computer (not shown) and may also be coupled to a keyboard, a mouse, a track ball, or other input device (not shown) to adjust the view, dimensions, color, font, or display characteristics. The image processing module 206 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices.

The system control unit 130 controls the generation of x-rays and image processing as a function of the resizing function performed by processing module 206, which utilizes the resizing algorithm, or re-mapping algorithm, and data stored in memories of processing module 206.

Figure 3:
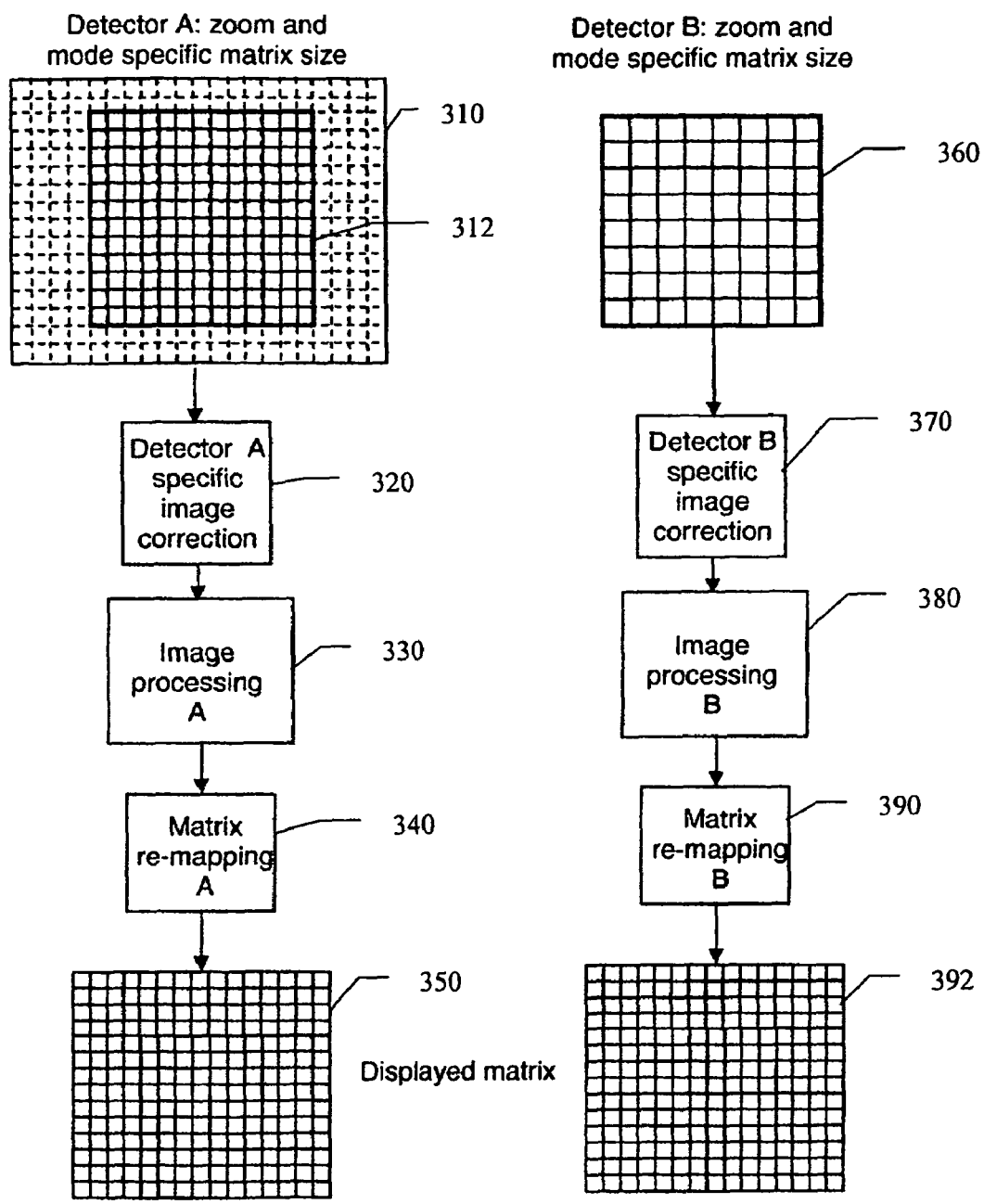
FIG. 3 shows a method of image processing of a bi-plane x-ray system.

FIG. 3 shows a diagram 300 of steps and image data, which may be stored on a computer-readable medium. FIG. 3 shows image processing for the two different detectors in a single combo lab. Two single-plane (or one bi-plane system) with different detectors (or differently run detector modes), where specific image pipelines with specific optimized parameter settings are required to make the final images of the two configurations appear similar. The steps may be executed by a processor, or otherwise executed to perform the identified functions. For example, the steps of FIG. 3 may be stored on a computer-readable medium, such as ROM, RAM, EEPROM, CD, DVD, or other non-volatile memory.

As shown in FIG. 3, image processing of the two images 310, 360 from the two detectors (detectors A and B) is performed in parallel, with parameter tuning to ensure the resultant images are as close as possible to each other. An input matrix 310, represents the received image data from a first detector (i.e., detector A). Step 320 shows that image pre-processing specific to the first detector is performed. Examples of detector-specific image pre-processing include, for example, gain and offset correction and pixel defect interpolation. Image processing is performed on the pre-processed image, with the parameters of the image processing adjusted to make the output image as close to the output image of the parallel image processing of the second detector, as shown in step 330. The processed matrix is re-mapped, as shown by step 340, to generate matrix 350 for display or further processing.

Similarly, input matrix 360 represents image data from a second detector, (i.e., detector B) which is received and processed. Image pre-processing specific to the second detector is carried out, as shown in step 370. Examples of detector-specific image pre-processing include, for example, gain and offset correction and pixel defect interpolation. Image processing is performed on the pre-processed image, as shown by step 380, with the parameters of the image processing adjusted to make the output image approximate, as close as possible, the output image of the first detector. The processed matrix is re-mapped, as shown in step 390, to generate matrix 392 for display or further processing.

The parameters of the image processing in step 330 (processing image data from the first detector, detector A) and the parameters of the image processing in step 380 (processing image data from the second detector, detector B) have to be closely matched in order to produce images 350 and 392 that are closely matched. This is often difficult to do, or it may be outright impossible, as explained previously.

The example in FIG. 3 shows only a partial readout of the physical matrix for detector A, while showing a complete readout of detector B. This is illustrated by the fact that image matrix 310 is larger than image matrix 312 which is read out from detector A.

According to embodiments of the present invention, a given format or zoom size (defined by the actual dimensions of the imaging area) will be mapped onto the same matrix size (defined by a given number of pixels per length dimension), before entering the image pipeline. Only detector-specific corrections (such as gain and offset corrections, and pixel defect interpolation) are applied before this re-mapping. This insures that a given object size will be represented by the same number of pixel in the re-mapped matrix (as long as the object size is reasonably large compared to the original pixel size).

After re-mapping to the new virtual matrix, object structures for both detectors A and B will be represented by approximately the same number of pixels. Also, the signal-to-noise ratio will be very similar, assuming the images taken by detectors A and B were acquired with comparable x-ray doses (and both detectors are designed using comparable technologies).

The following examples illustrate a simple case of a "one-dimensional" object aligned horizontally or vertically along the pixels of the detector matrix. While for detector A with a pixel size of 150 μm, an object with a length of 1000 μm will be represented by about 7 pixels, the same object acquired with detector B with a pixel size of 200 μm will be represented by about 5 pixels. The actual positioning (phase shift) of the object with respect to the pixel edges is ignored in this example. Re-mapping is performed onto a matrix with a virtual pixel dimension of 170 μm. In this case, after re-mapping the original matrices of detector A and B into virtual matrices of the same dimensions, the object will be represented by about 6 pixels in both detectors A and B.

A given format size may be re-mapped (independent of the actual physical pixel size) to an appropriate virtual matrix size (generating a given virtual pixel size). For example, a format of 40×40 $cm^2$ (independent of physical matrix size, for example, independent of detector design or pixel-binning) may be rescaled to a matrix of 1600×1600 pixels. A format of 30×30 $cm^2$ may be rescaled to a matrix of 1200×1200 pixels. A format of 20×20 $cm^2$ may be rescaled to a matrix of 1000×1000 pixels. And a format of 15×15 $cm^2$ may be rescaled to a matrix of 800×800 pixels.

Before the image is actually displayed on a monitor, any of the above formats may be rescaled to a matrix size of 1024×1024 pixels, or before the image is actually saved on disk, any of the above formats may be rescaled to a matrix size of 512×512 pixels.

Rectangular areas produce respective rectangular virtual matrix sizes. For example, a rectangular area of 40×30 cm$^2$ may produce a virtual matrix of dimensions 1600×1200 pixels.

Embodiments of the invention may be extended to the case where the original detector matrix is read out in a "binned" (super-pixel) configuration. For example, a physical matrix of 2000×2000 physical pixels may be read out as a 1000×1000 matrix; hence 2×2 pixels are combined to one "super-pixel" before, or during, readout. This may be done for reasons of detector speed (frame rates) or signal-to-noise-ratio reduction. It may be required that a detector, having a physical matrix of 2000×2000 pixels, running at 30 frames per second (fps), be read out as a 1000×1000 matrix (for data transfer bandwidth reasons), while it may be read out as a 2000×2000 matrix when it is running at 15 fps or less. The re-mapping onto a virtual matrix may be applied for such cases as well.

The principle of resizing according to the present invention may also be applied to a bi-plane configuration where detector A is read out in a binned configuration (for example, 2×150 μm=300 μm in the above example) and detector B in non-binned configuration (200 μm in that example). Re-mapping the readout matrices to a common virtual matrix (or virtual pixel) size will normalize object sizes to pixel-ratios and normalize signal-to-noise ratios, and hence allow for standardized image processing.

Rectangular (non-square) formats of physical detector matrices may be treated analogous to true square formats. For example, differently sized pixel sizes of different detector types are re-mapped to the same virtual pixel sizes.

After matrix re-mapping, the re-mapped matrices are processed in a common image pipeline. After image processing, the matrices may be re-mapped again into two matrices of different dimensions for display or further processing.

Figure 4:
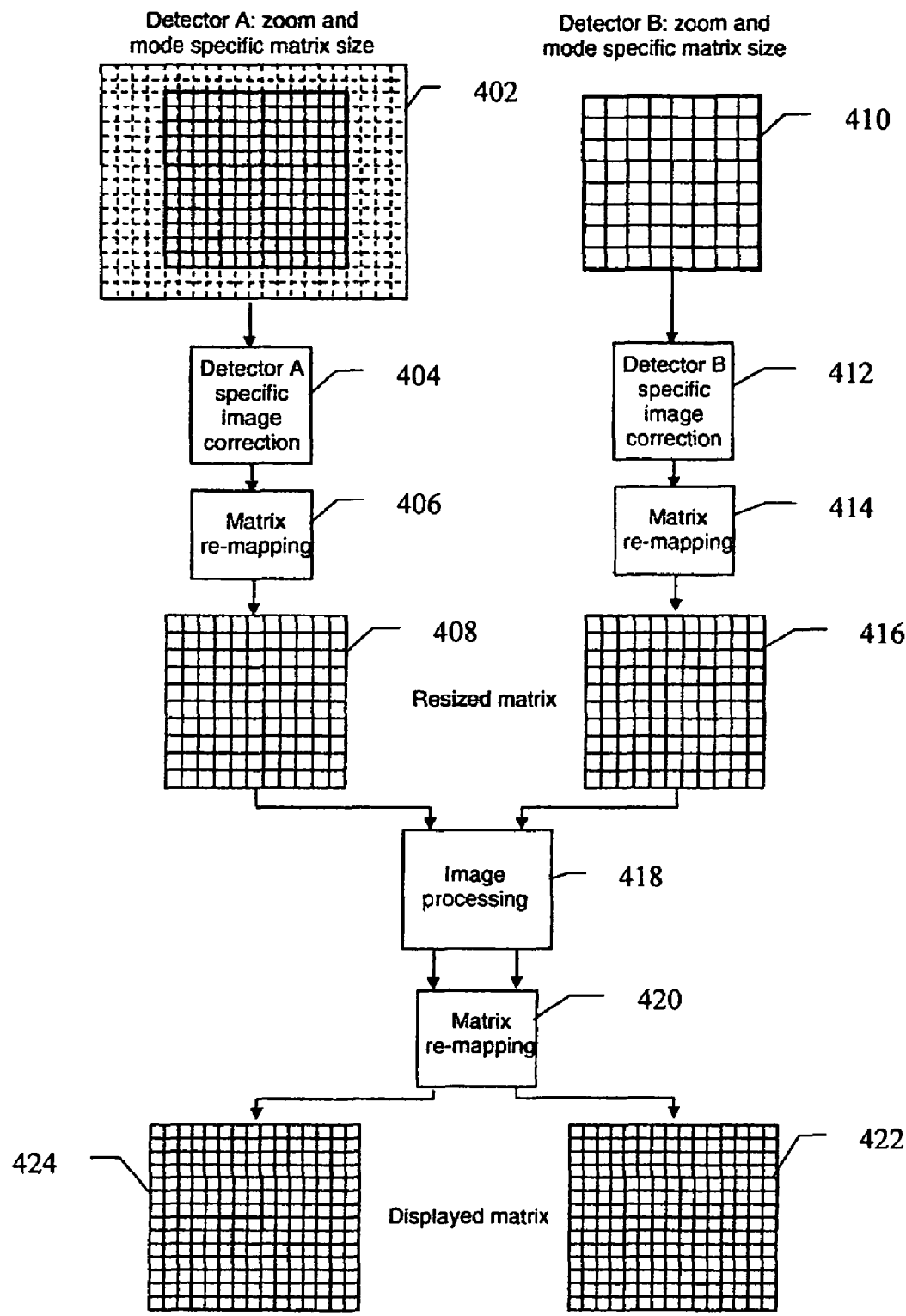
FIG. 4 illustrates a method of image processing utilizing image resizing to a standard matrix size.

FIG. 4 shows a diagram 400 of steps and image data. The steps and image data may be stored on a computer-readable medium. The embodiment shown in FIG. 4 is directed to image processing utilizing image resizing to a standard matrix size. FIG. 4 shows an embodiment with two single-plane (or one bi-plane system) with different detectors (or differently run detector modes) in which re-mapping to appropriate matrix sizes is done prior to running through the same image pipeline configuration to make the images from the two different detectors appear similar. For example, the steps of FIG. 4 may be stored on a computer-readable medium, such as ROM, RAM, EEPROM, CD, DVD, or other non-volatile memory.

As shown in FIG. 4, a first matrix of image data 402 is received from a first detector (e.g., detector A). In step 404, image pre-processing specific to the first detector is performed on the first matrix 402. The first matrix 402 is re-mapped to a first virtual matrix 406 as a function of the image pre-processing of step 404. First virtual image matrix 406 has a given size, or dimension. Additionally, a second matrix of image data 410 is received from a second detector (e.g., detector B). In step 412, image pre-processing specific to the second detector is performed on the second matrix 410. The second matrix 410 is re-mapped to a second virtual matrix 416 as a function of the matrix remapping performed in step 414. The second virtual matrix 416 has the same size, or dimensions, as the first virtual matrix 408. The first and second virtual matrices 408 and 416 are of the same dimensions, thereby giving the advantages of a common matrix size described in detail above.

Common image processing may be applied to both virtual matrices 408 and 416, as shown in step 418, since the virtual matrices are of the same dimensions, and all pixels correspond to the same physical dimensions, as described above.

The two virtual matrices 408 and 416 may be re-mapped to different matrix sizes, as appropriate, for display or further image processing, as shown in step 420. For example, virtual matrix 408 may be re-mapped to a virtual matrix 424 of size 1024×1024 pixels for display, using for example, display module 140 described herein; while virtual matrix 416 may be remapped to a virtual matrix 422 of size 512×512 pixels for storage, for example, in memory 215, 217 and/or 219 described herein.

Generally, several configurations may occur stand-alone or in combination: (1) detectors with different physical pixel sizes; (2) detector readout modes with binned or non-binned configurations; (3) single detectors or Multi-detector systems; and (4) square or rectangular readout matrices.

Rectangular (non-square) formats of physical detector matrices may be treated analogous to true square formats, for example, differently sized pixel sizes of different detector types may be re-mapped to the same virtual pixel sizes.

The above discussion applies both to 1) systems which use two detectors and 2) two or more different systems with their own detectors. The above discussion also applies both to 1) systems which use two different detector types, as well as to 2) different systems with different detector types or which have the same detector types configured differently. In the first cases, the image quality differences or similarities will be seen in the same system, in the second cases it will be apparent when comparing the two systems.

There are a number of techniques to enlarge or reduce an image (re-map from one matrix size to another). These generally have a tradeoff between speed and the degree to which they reduce visual artifacts. For example, one method to enlarge an image by a factor 2 is to replicate each pixel 4 times; however, this will lead to more pronounced jagged edges than existed in the original image. Similar principles apply to reducing an image by an integer divisor of the width by simply keeping every nth pixel. Aliasing of high frequency components in the original will occur. The more general case of changing the size of an image by an arbitrary amount typically includes interpolation between pixels.

Re-mapping from one matrix size to another may be done by any of a number of methods, including, for example, nearest neighbor, bi-linear, bi-cubic, or other appropriate methods that minimizes loss of resolution and minimizes introduction of artifacts. These remapping methods may be algorithms executed by a processor, or otherwise executed to perform the identified functions and stored in one or more memories. For example, the steps of the re-mapping algorithm may be stored on a computer-readable medium, such as ROM, RAM, EEPROM, CD, DVD, or other non-volatile memory. The image data generated may be stored in similar types of electronic media or memory.

As illustrative of one embodiment only and not intended to be limiting, using the method of nearest neighbor involves finding the closest corresponding pixel in the source (original) image (i, j) for each pixel in the destination image (i', j'). If the source image has dimensions w and h (width and height), and the destination image dimensions w' and h', then a point in the destination image is given by Equation 1:

$$i'=i*(w'/w)$$

$$j'=j*(h'/h), \tag{1}$$

where the division above is integer (the remainder is ignored). This form of interpolation may deviate from normally acceptable aliasing effects for both enlarging and reduction of images.

Another approach, intended to be illustrative only, is called bicubic interpolation, which estimates the color at a pixel in the destination image by an average of 16 pixels surrounding the closest corresponding pixel in the source image. (Still another interpolation technique, called bilinear interpolation, discussed below, uses the value of 4 pixels in the source image.) Of the bicubic methods that may be used for interpolating 4×4 pixels, the cubic B-spline approach is discussed here.

Figure 5A:
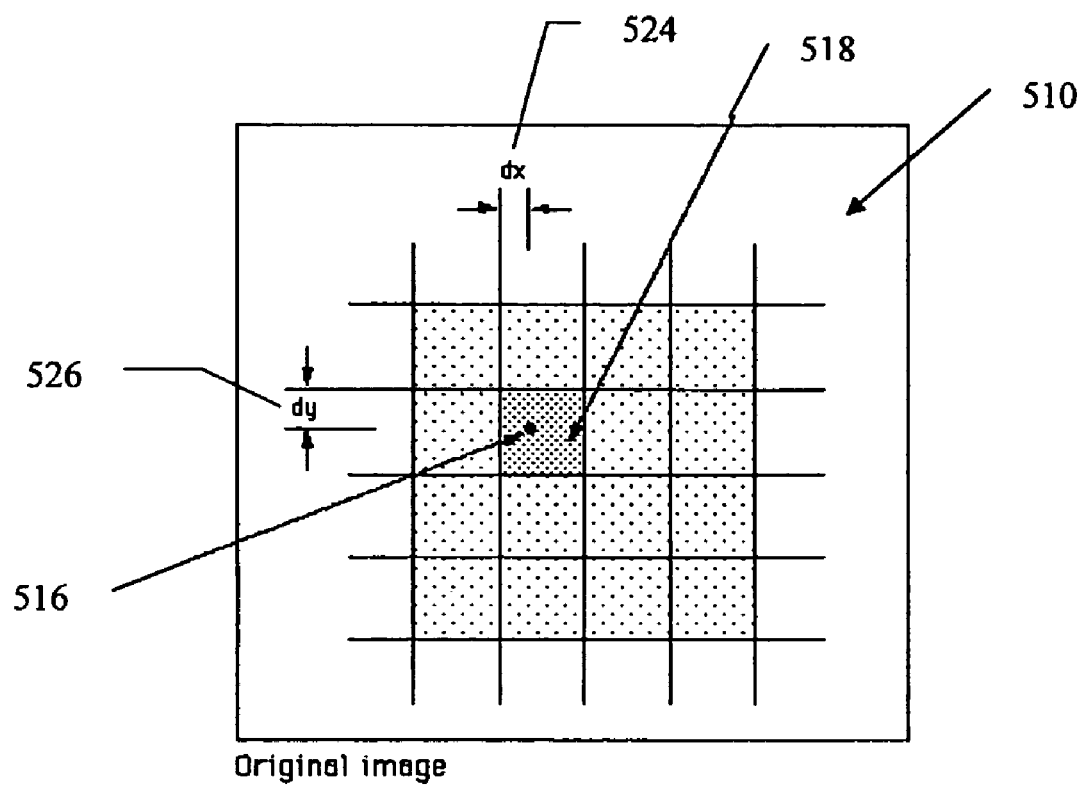
FIGS. 5A and 5B show an example of re-mapping/re-sizing data.
Figure 5B:
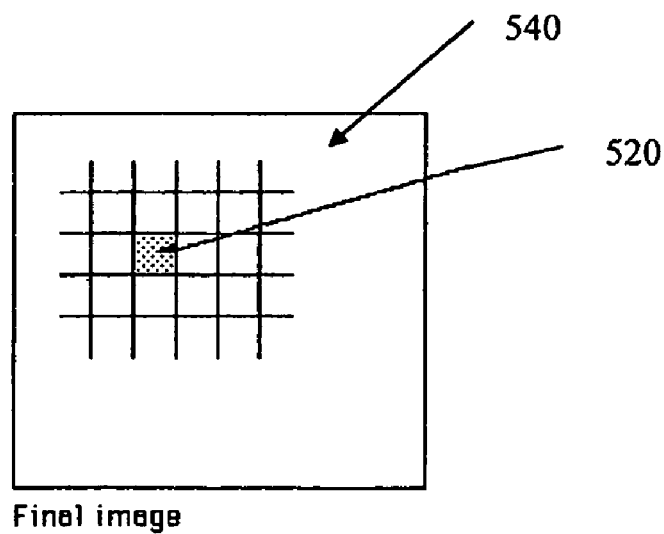

FIGS. 5A and 5B show an example of re-mapping data using cubic B-splines in conjunction with Equation 2. FIG. 5A shows original data 510 and FIG. 5B shows final image 540. The re-mapping process determines the color of every point (i', j') 520 in the final (destination) image 540 of FIG. 5B. There is a linear scaling relationship between the two images 510, 540 of FIGS. 5A and 5B. In general, a point (i', j') 520 of FIG. 5B corresponds to a non-integer position 516 in the original (source) image of FIG. 5A. This position is given by Equation 2:

$$x=i*(w'/w)$$

$$y=j*(h'/h). \tag{2}$$

The nearest pixel coordinate (i, j) 518 of FIG. 5A is the integer part of x and y; and therefore dx 524, and dy 526 in FIG. 5A represents the difference between these, as shown in Equation 3:

$$dx=x-i$$

$$dy=y-j. \tag{3}$$

Equation 4 gives the interpolated value according to the B-splines as it is applied to each of the red, green, and blue components. The m and n summations span a 4×4 grid around the pixel (i, j) (518).

$$F(i', j') = \sum_{m=-1}^{2} \sum_{n=-1}^{2} F(i+m, j+n)R(m-dx)R(dy-n) \tag{4}$$

The cubic weighting function R(x) is shown in Equation 5:

$$R(x) = \frac{1}{6}[P(x+2)^3 - 4P(x+1)^3 + 6P(x)^3 - 4P(x-1)^3] \tag{5}$$

The following treatise provides greater details of bilinear and bicubic interpolation techniques: Jones, Phillip W., "A User's Guide for SCRIP: A Spherical Coordinate Remapping and Interpolation Package," *Los Alamos National Laboratory Report*, 1997-1998, which is hereby incorporated by reference in its entirety herein.

Figure 6A:
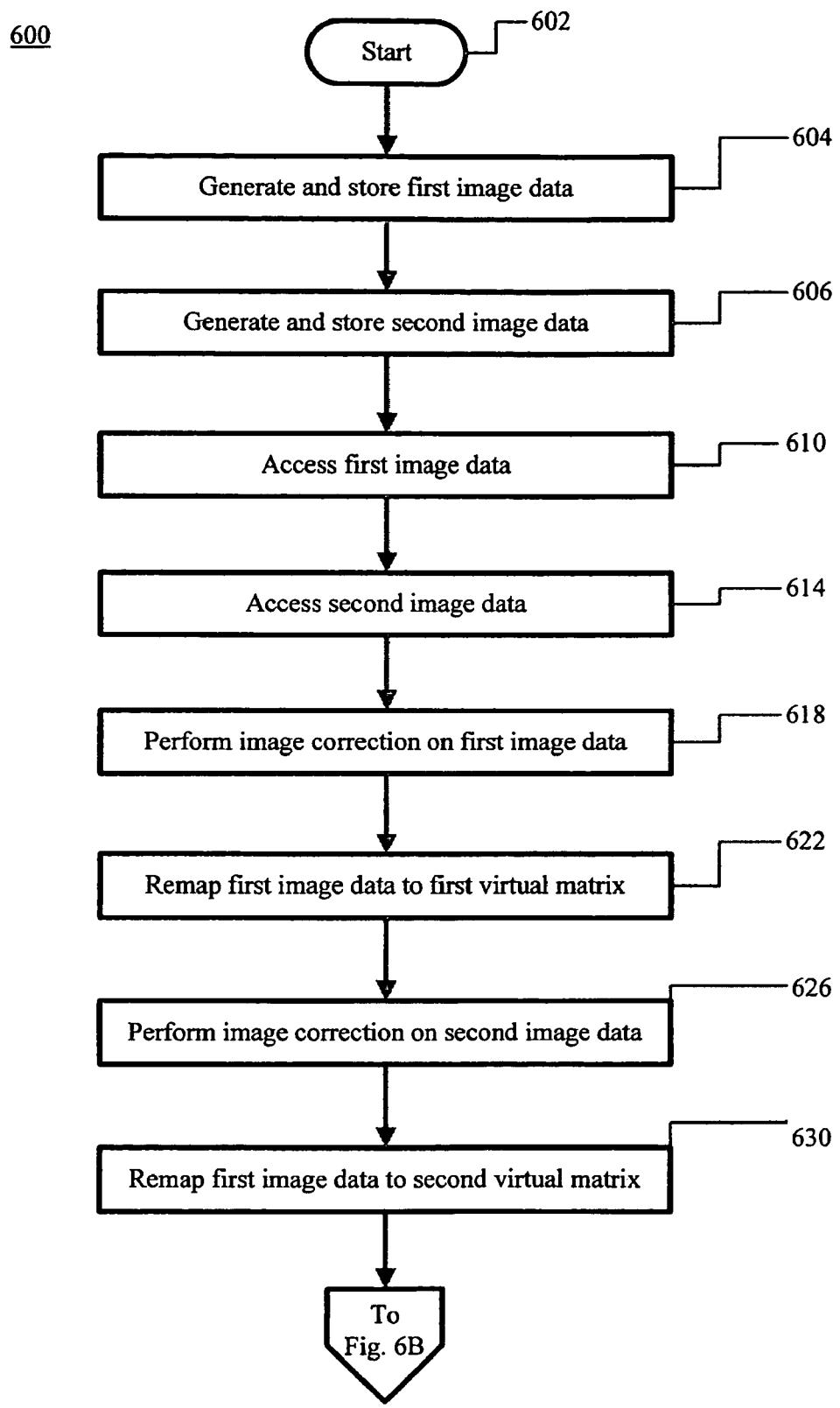
FIGS. 6A and 6B show a flowchart of steps to implement an embodiment of the present invention.
Figure 6B:
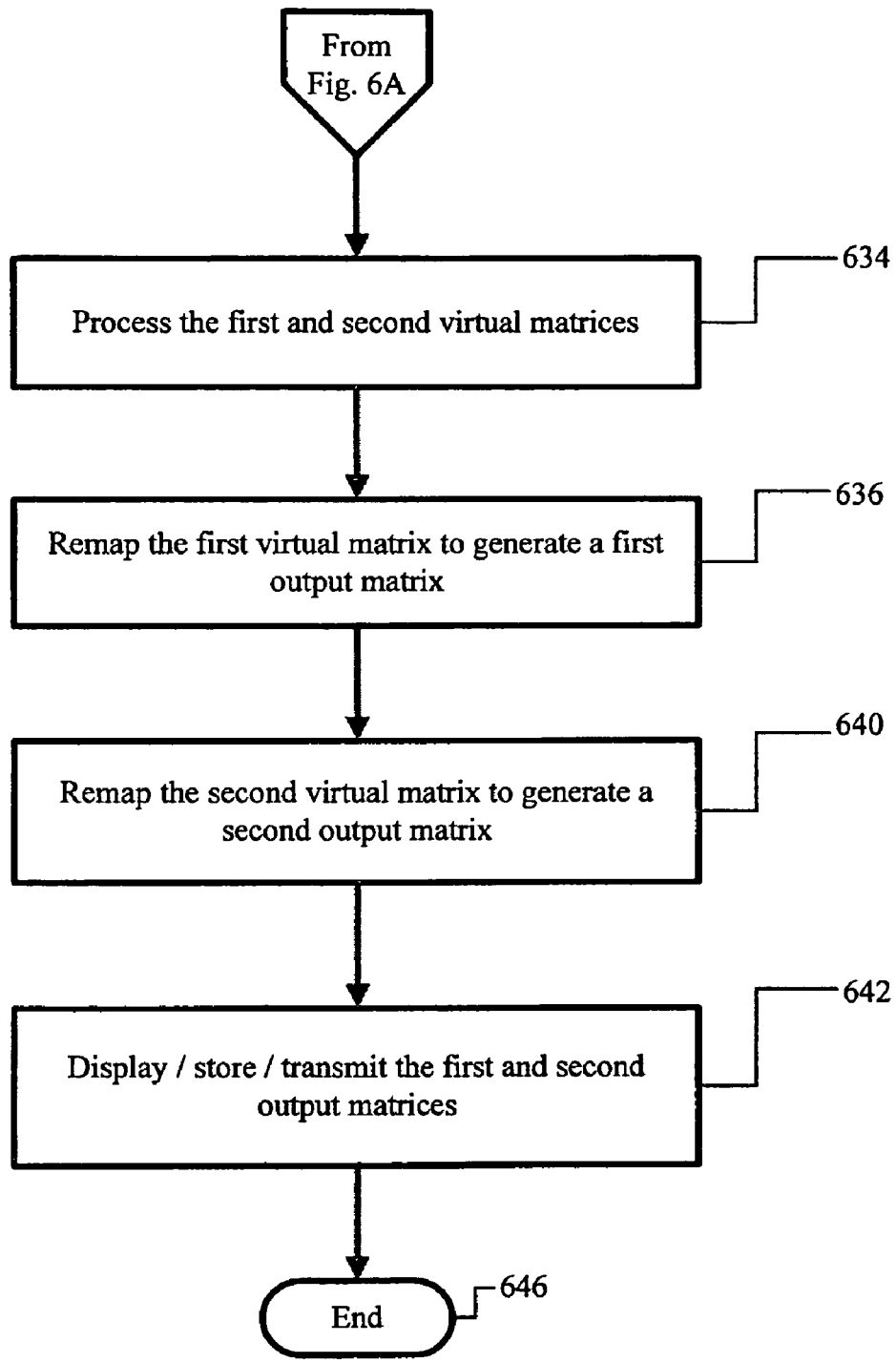

FIGS. 6A and 6B show a flowchart of steps 600 to implement an embodiment of the present invention. The steps 600 may be executed by a processor, or otherwise executed to perform the identified functions and may also be stored in one or more memories. For example, the steps of FIG. 6 may be stored on a computer-readable medium, such as ROM, RAM, EEPROM, CD, DVD, or other non-volatile memory.

Step 602 is a starting step to begin the method. First image data is generated, as shown in step 604. Second image data is generated, as shown in step 606. This first and second image data is typically generated by two different detectors and typically is in the form of a matrix. The matrices generated by the first and second detectors typically do not have matching dimensions.

The first and second image data may also be stored in a computer-readable medium and/or electronic memory module. The first image data is accessed, as shown in step 610 and the second image data is accessed as shown in step 614.

Image correction processing may be performed on the first image data, as shown in step 618. This processing is typically pre-processing specific to the first detector. The first image data is re-mapped to form a first virtual matrix, as shown in step 622.

Image correction processing may be performed on the second image data, as shown in step 626. This processing is typically pre-processing specific to the second detector. The second image data is re-mapped to form a second virtual matrix, as shown in step 630. The first virtual matrix and the second virtual matrix have the same dimensions and are processed, as shown in step 634.

The first virtual matrix is re-mapped to generate a first output matrix, as shown in step 636 and the second virtual matrix is re-mapped to generate a second output matrix, as shown in step 640. The first and second output matrices may be displayed and/or stored and/or transmitted to another memory or output device, as shown in step 642. End step 646 shows the process ends.

That is, it is an embodiment of the invention to re-map image data from two or more detectors into virtual matrices of the same dimensions in order to utilize a common image pipeline.

It will be appreciated from the above that the invention may be implemented as computer software, which may be supplied on a storage medium or via a transmission medium such as a local-area network or a wide-area network, such as the Internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for processing X-ray image data from two or more radiation detector image data sources of an X-ray imaging system having first and second X-ray radiation emitters and corresponding first and second radiation detector image data sources respectively, comprising the activities of:

accessing first image data from a first radiation detector image data source;

accessing second image data from a second radiation detector image data source, said first image data having a different individual pixel size than said second image data;

remapping the first image data to form a first matrix of pixel data having a first size for individual pixels;

remapping the second image data to form a second matrix of pixel data having substantially said first size for individual pixels; and processing the first matrix and the second matrix with common image processing functions.

2. The method according to claim 1, further comprising:

generating the first image data from a first detector; and generating the second image data from a second detector and wherein the first matrix and the second matrix have different numbers of pixels.

3. The method according to claim 2, further comprising:
performing image correction specific to the first detector on the first image data prior to the remapping of the first image data; and
performing image correction specific to the second detector on the second image data prior to the remapping of the second image data.

4. The method according to claim 1, wherein structures from the one or more sources are represented by approximately the same quantity of pixels and including the activity of remapping the first matrix and the second matrix into matrices of different dimensions wherein said first image has individual pixels of said first size.

5. The method according to claim 1, wherein a signal-to-noise ratio of the first matrix and a signal-to-noise ratio of the second matrix are approximately equal.

6. The method according to claim 1, wherein at least one of the first matrix and second matrix individual pixels comprise binned pixels.

7. The method according to claim 1, wherein at least one of the first matrix and the second matrix is in a binned or non-binned configuration.

8. The method according to claim 1, further comprising:
performing a bi-linear interpolation process during the remapping of the first matrix and during the remapping of the second matrix.

9. The method according to claim 1, further comprising:
performing a bi-cubic interpolation process during the remapping of the first matrix and during the remapping of the second matrix.

10. A method for processing X-ray image data from two or more radiation detector image data sources of an X-ray imaging system having first and second X-ray radiation emitters and corresponding first and second radiation detector image data sources respectively, comprising the activities of:
accessing first image data from a first radiation detector image data source;
accessing second image data from a second radiation detector image data source, said first image data having a different individual pixel size than said second image data;
remapping the first image data to form a first matrix of pixel data having a first size for individual pixels;
remapping the second image data to form a second matrix of pixel data having substantially said first size for individual pixels; and
processing the first matrix and the second matrix with common image processing functions wherein the first detector and the second detector are x-ray detectors under different operating conditions and wherein the activity of processing the first matrix and the second matrix comprises remapping the first matrix and the second matrix to form a third matrix having different dimensions to the first and second matrix.

11. A method for processing X-ray image data from two or more radiation detector image data sources of an X-ray imaging system having first and second X-ray radiation emitters and corresponding first and second radiation detector image data sources respectively, comprising the activities of:
accessing first image data from a first radiation detector image data source;
accessing second image data from a second radiation detector image data source, said first image data having a different individual pixel size than said second image data;
remapping the first image data to form a first matrix of pixel data having a first size for individual pixels;
remapping the second image data to form a second matrix of pixel data having substantially said first size for individual pixels;
processing the first matrix and the second matrix with common image processing functions; and
remapping the first matrix and the second matrix into matrices of different dimensions wherein said first image has individual pixels of said first size and said step of remapping the first image data to form said first matrix comprises maintaining the same matrix size unaltered.

12. An apparatus for processing X-ray image data from two or more radiation detector image data sources of an X-ray imaging system having first and second X-ray radiation emitters and corresponding first and second radiation detector image data sources respectively, comprising:
means for accessing first image data from a first radiation detector image data source;
means for accessing second image data from a second radiation detector image data source, said first image data having a different individual pixel size than said second image data;
means for remapping the first image data to form a first matrix of pixel data having a first size for individual pixels;
means for remapping the second image data to form a second matrix of pixel data having substantially said first size for individual pixels; and
means for processing the first matrix and the second matrix with common image processing functions.

13. The apparatus according to claim 12, further comprising:
means for generating the first image data from a first detector; and
means for generating the second image data from a second detector and wherein the first matrix and the second matrix have different numbers of pixels.

14. The apparatus according to claim 13, wherein the first detector and the second detector are x-ray detectors under different operating conditions and wherein the processing of the first matrix and the second matrix comprises remapping the first matrix and the second matrix to form a third matrix having different dimensions to the first and second matrix.

15. The apparatus according to claim 13, further comprising:
means for performing image correction specific to the first detector on the first image data prior to the remapping of the first image data; and
means for performing image correction specific to the second detector on the second image data prior to the remapping of the second image data.

16. The apparatus according to claim 12, wherein structures from the one or more sources are represented by approximately the same quantity of pixels and including means for remapping the first matrix and the second matrix into matrices of different dimensions wherein said first image has individual pixels of said first size.

17. The apparatus according to claim 12, wherein a signal-to-noise ratio of the first matrix and a signal-to-noise ratio of the second matrix are approximately equal.

18. The apparatus according to claim 12, further comprising:

means for remapping the first matrix and the second matrix into matrices of different dimensions wherein said first image has individual pixels of said first size and said step of remapping the first image data to form said first matrix comprises maintaining the same matrix size unaltered.

19. The apparatus according to claim 12, wherein at least one of the first matrix and second matrix individual pixels comprise binned pixels.

20. The apparatus according to claim 12, wherein at least one of the first matrix and the second matrix is in a binned or non-binned configuration.

21. The apparatus according to claim 12, further comprising:
means for performing a bi-linear interpolation process during the remapping of the first matrix and during the remapping of the second matrix.

22. The apparatus according to claim 12, further comprising:
means for performing a bi-cubic interpolation process during the remapping of the first matrix and during the remapping of the second matrix.

23. A system for processing X-ray image data from two or more radiation detector image data sources of an X-ray imaging system having first and second X-ray radiation emitters and corresponding first and second radiation detector image data sources respectively, comprising:
at least one memory;
at least one processor, coupled to the at least one memory, the at least one processor adapted to execute code that performs the steps of:
access first image data from a first radiation detector image data source;
access second image data from a second radiation detector image data source, said first image data having a different individual pixel size than said second image data;
remap the first image data to form a first matrix of pixel data having a first size for individual pixels;
remap the second image data to form a second matrix of pixel data having substantially said first size for individual pixels; and
process the first matrix and the second matrix with common image processing functions.

24. The system according to claim 23, further comprising program code to:
generate the first image data from a first detector; and
generate the second image data from a second detector and wherein the first matrix and the second matrix have different numbers of pixels.

25. The system according to claim 23, further comprising program code to:
perform image correction specific to the first detector on the first image data prior to the remapping of the first image data; and
perform image correction specific to the second detector on the second image data prior to the remapping of the second image data and wherein the processing of the first matrix and the second matrix comprises remapping the first matrix and the second matrix to form a third matrix having different dimensions to the first and second matrix.

26. The system according to claim 23, further comprising program code to:
remap the first matrix and the second matrix into matrices of different dimensions wherein said first image has individual pixels of said first size.

* * * * *